(12) United States Patent
Hironaka

(10) Patent No.: US 7,040,594 B2
(45) Date of Patent: May 9, 2006

(54) SOLENOID VALVE

(75) Inventor: Hideharu Hironaka, Anjo (JP)

(73) Assignee: Advics Co., Ltd., Aichi-pref. (JP)

( * ) Notice: Subject to any disclaimer, the term of this patent is extended or adjusted under 35 U.S.C. 154(b) by 62 days.

(21) Appl. No.: 10/854,145

(22) Filed: May 27, 2004

(65) Prior Publication Data
US 2005/0001183 A1   Jan. 6, 2005

(30) Foreign Application Priority Data
Jul. 3, 2003   (JP) .............................. 2003-270665

(51) Int. Cl.
*F16K 31/06* (2006.01)

(52) U.S. Cl. ...................... 251/50; 251/54; 251/129.07; 251/129.15

(58) Field of Classification Search ................... 251/48, 251/50, 54, 129.07, 129.15, 282
See application file for complete search history.

(56) References Cited

U.S. PATENT DOCUMENTS

| | | | | |
|---|---|---|---|---|
| 3,523,676 A | * | 8/1970 | Barker .................. | 251/129.05 |
| 3,666,231 A | * | 5/1972 | Parodi et al. ............ | 251/129.1 |
| 3,768,517 A | * | 10/1973 | Pauliukonis ........... | 137/625.65 |
| 4,634,096 A | * | 1/1987 | Hara ...................... | 251/129.15 |
| 4,852,853 A | * | 8/1989 | Toshio et al. .......... | 251/129.07 |
| 5,139,224 A | * | 8/1992 | Bright ..................... | 251/50 |
| 5,601,275 A | * | 2/1997 | Hironaka ................ | 251/129.15 |
| 5,722,633 A | * | 3/1998 | Goossens et al. ....... | 251/129.15 |
| 5,918,635 A | * | 7/1999 | Wang et al. ............ | 137/625.65 |
| 6,003,838 A | * | 12/1999 | Beck ...................... | 251/129.15 |
| 6,021,997 A | * | 2/2000 | Hell ........................ | 251/30.04 |
| 6,739,571 B1 | * | 5/2004 | Hironaka ................ | 251/50 |
| 6,959,907 B1 | * | 11/2005 | Hironaka ................ | 251/50 |

FOREIGN PATENT DOCUMENTS

| | | |
|---|---|---|
| DE | DD 131780 | 7/1978 |
| JP | U-5-56717 | 7/1993 |

* cited by examiner

*Primary Examiner*—Justine R. Yu
*Assistant Examiner*—Peter deVore
(74) *Attorney, Agent, or Firm*—Posz Law Group, PLC

(57) ABSTRACT

When a plunger moves toward a side of a valve seat, an end face of a sealing member on a space side is separated from a surface of a seal housing groove, whereby a portion between a communication passage formed on an inner peripheral side of the sealing member is communicated with the space. At this time, an end face of the sealing member on a side of a damper chamber contacts the surface of the seal housing groove. However, since a part of a communication groove is communicated with the communication passage, the damper chamber is communicated with the communication passage through the communication groove. Accordingly, since the damper chamber is communicated with the space through the communication passage, a damping effect is not exerted.

4 Claims, 4 Drawing Sheets

SOLENOID VALVE

CROSS REFERENCE TO RELATED APPLICATION

This application is based upon and claims the benefit of Japanese Patent Application No. 2003-270665 filed on Jul. 3, 2003, the content of which are incorporated herein by reference.

FIELD OF THE INVENTION

The present invention relates to a solenoid valve which is used for opening and closing a fluid passage by applying current to a coil. The present invention relates to, for example, a solenoid valve which is preferably used as a brake fluid pressure control valve disposed in a brake conduit of an ABS actuator which is provided in a vehicle brake apparatus.

BACKGROUND OF THE INVENTION

In a conventional solenoid valve, when current is not applied to a coil, a plunger is urged by a spring. On the other hand, when current is applied to the coil, the plunger is attracted resisting elastic force of the spring, and a fluid passage is opened and closed by a valve element which moves together with the plunger.

In a solenoid valve like this, generation of a noise caused by a collision of the plunger or the valve element and a noise caused by pulsation of fluid is prevented, by reducing a moving speed of the plunger using a damping effect of a damper chamber which is disposed on one end side of the plunger.

Further, in order to improve responsiveness of the solenoid valve when the plunger moves, a solenoid valve is proposed which is provided with a check valve such that the plunger does not act in a direction because the damping effect is unnecessary affected. Note that the check valve provided with a ball, spring and a cap is built in the plunger. Further, the plunger is formed with a fluid passage and a valve seat. (For example, please refer to Japanese Utility Model Application Laid Open No. 5-56717.)

In the conventional solenoid valve, however, since the check valve remains closed and the damping effect is exerted until a pressure difference reaches a valve opening pressure, delay in response of the solenoid valve occurs. Moreover, dispersion in responsiveness of the solenoid valve caused by dispersion in a load of the spring increases. Further, the check valve has a large number of component parts and the plunger requires a lot of additional manufacturing processing such as forming the fluid passage, the valve seat and the like.

SUMMARY OF THE INVENTION

In light of the above described problems, it is an object of the present invention to improve a responsiveness of a solenoid valve, when a plunger moves in a direction because a damping effect is unnecessary affected.

According to an aspect of the present invention, when a plunger moves in a direction because the damping effect is not necessary affected, a communication passage is opened with a valve opening pressure being zero. Therefore, delay in response of the solenoid valve which occurred with a conventional solenoid valve, that is, delay in response of the solenoid valve caused by the damping effect which is exerted until a check valve is opened does not occur.

Further, a sealing member and the plunger achieve a function of a check valve. Therefore, a number of component parts of the check valve can be reduced. Further, since the check valve dose not use a spring, dispersion in the responsiveness of the solenoid valve can be reduced.

The present invention is also embodied by forming a communication groove on an outer peripheral surface of the plunger for always communicating a damper chamber with the communication passage. A configuration like this can be embodied such that at least a part of the communication groove is positioned at an inner position than an inner peripheral surface of the sealing member.

According to a preferred form of the aspect of the present invention, a communication groove is formed in a surface, that faces a second surface, of the sealing member for always communicating the damper chamber with the communication passage. Accordingly, since it is possible to abolish the communication groove of the plunger, additional processing for the plunger can be reduced.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
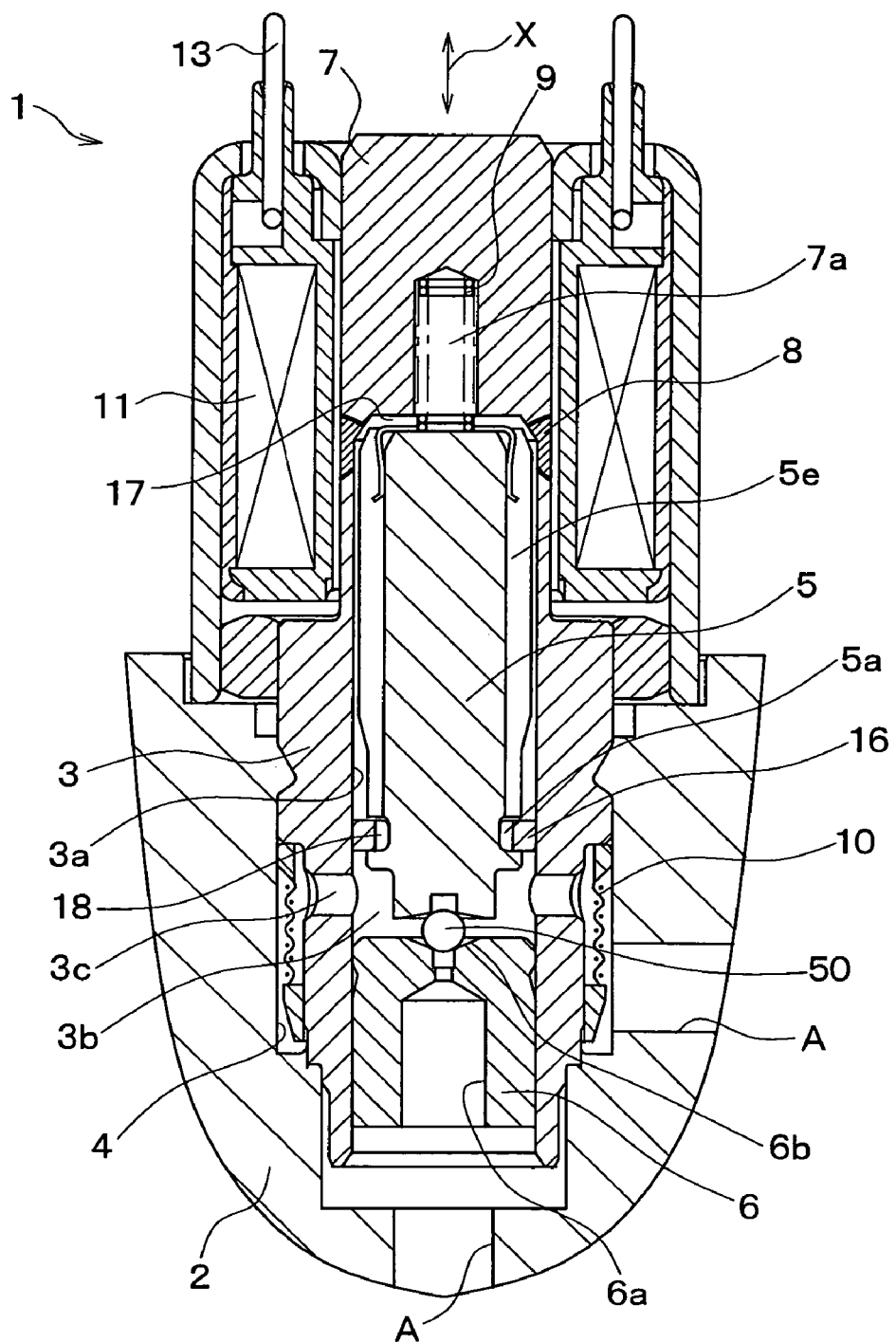
FIG. 1 is a sectional view of a whole structure of a solenoid valve according to a first embodiment of the present invention.

The present invention will be described further with reference to various embodiments in the drawings.

First Embodiment

Figure 2:
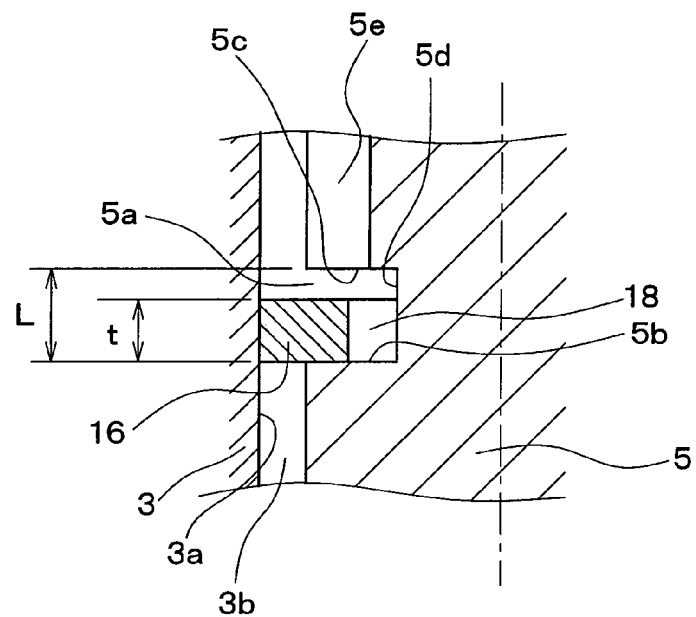
FIG. 2 is an enlarged sectional view of a vicinity of a sealing member when opening the solenoid valve of FIG. 1.
Figure 3:
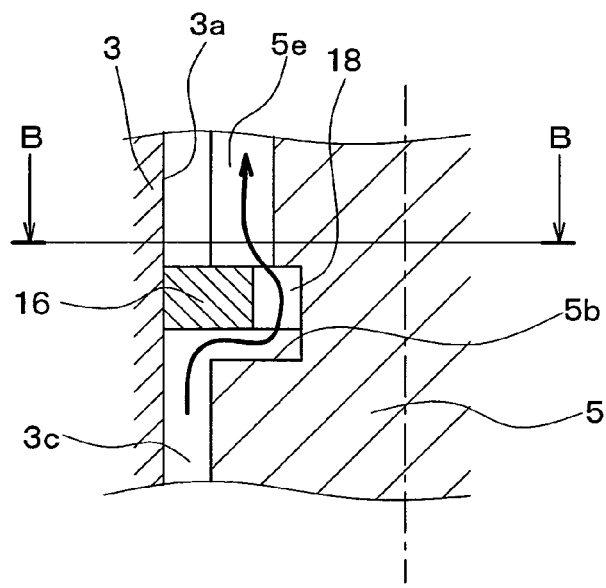
FIG. 3 is a an enlarged sectional view of a vicinity of the sealing member when closing the solenoid valve as shown in FIG. 1.
Figure 4:
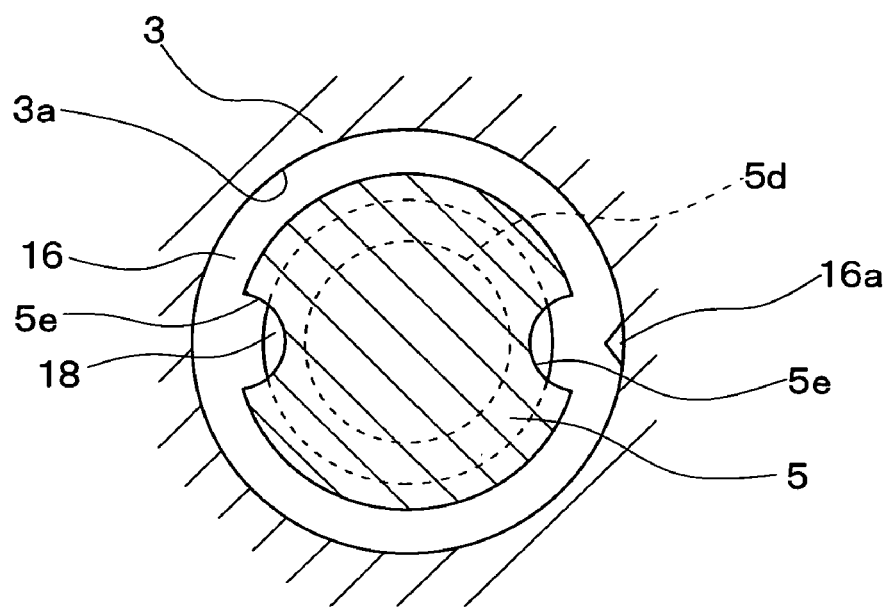
FIG. 4 is a sectional view taken along line B—B of FIG. 3.
Figure 5:
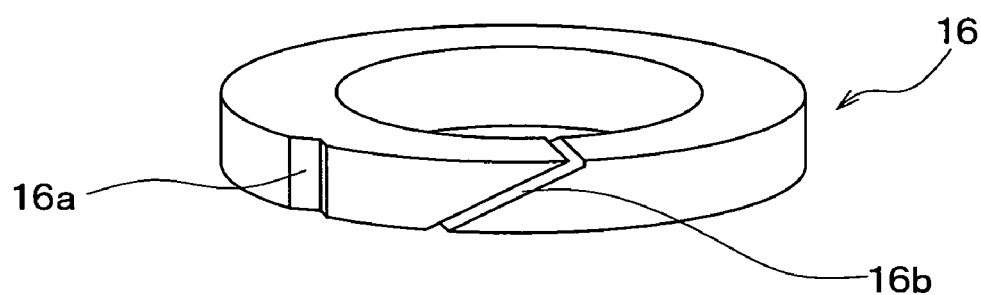
FIG. 5 is a perspective view of the sealing member of FIG.1.

Hereinafter, a solenoid valve according to a first embodiment of the present invention will be explained. FIG. 1 is a sectional view of a whole structure of a solenoid valve 1 according to a first embodiment of the present invention; FIG. 2 is an enlarged sectional view of a vicinity of a sealing member 16 when opening the valve; FIG. 3 is a an enlarged sectional view of a vicinity of the sealing member 16 when closing the valve; FIG. 4 is a sectional view taken along line B—B of FIG. 3; and FIG. 5 is a perspective view of the sealing member 16.

As shown in FIG. 1, the solenoid valve 1 is disposed in a fluid passage A of brake fluid which is formed, for example, in a housing 2 of an ABS actuator. FIG. 1 shows a state when normal braking is executed, that is, when current is not applied to a coil. Note that the fluid passage A corresponds to a fluid passage of the present invention.

As shown in FIG. 1, the solenoid valve 1 is provided with a guide 3 made of a magnetic metal. The guide 3 is formed into a stepped cylindrical shape, and a part of the guide 3 is fitted into a recess portion 4 of the housing 2 of the ABS actuator. The guide 3 is fixed to the housing 2 by caulking a vicinity of an opening end of the recess portion 4 so as to cause a part of the housing 2 to enter a cavity provided in the guide 3.

A guide hole 3a and a communication hole 3c are formed in the guide 3. The guide hole 3a holds the plunger 5 so as to be slidable and a valve seat 6 is pressed thereinto. The communication hole 3c communicates a space 3b surrounded by the plunger 5, the valve seat 6, and the guide hole 3a with the fluid passage A formed in the housing 2.

A bottomed cylindrically-shaped stator core 7 made of magnetic metal is welded to one end of the guide 3 through a non-magnetic member 8 made of a non-magnetic metal. This closes one end of the guide hole 3a. Note that the guide 3 and the stator core 7 correspond to a cylindrical member according to the present invention.

The plunger 5 is made of a magnetic metal. The plunger 5 has a cylindrical shape, and a spherical valve element 50 is fixed to one end of the plunger 5 on a side of the valve seat 6. A spring 9, attached in a spring hole 7a formed in the stator core 7, presses the plunger 5 to the valve seat 6.

The valve seat 6, made of a metal, is cylindrical-shaped. A communication hole 6a is formed at a central portion in the radial direction of the valve seat 6 which communicates the space 3b in the guide 3 with the fluid passage A formed in the housing 2. A taper-shaped seat 6b, which the valve element 50 of the plunger 5 contacts and separates from, is formed at one end of the communication hole 6a on a side of the space 3b.

A coil 11 which creates a magnetic field when current is applied is disposed surrounding the stator core 7. A terminal 13 is pulled out from the coil 11, and current is applied from outside to the coil 11 through the terminal 13.

As shown in FIGS. 2 to 5, a ring-shaped seal housing groove 5a which is fitted to and encircles an outer periphery of the plunger 5, and a sealing member 16 is attached to the seal housing groove 5a. The sealing member 16 isolates a damper chamber 17 formed on a side of the stator core 7 of the plunger 5 from the space 3b and the fluid passage A.

The sealing member 16 is a ring-shaped thin-plate made of resin and has a generally rectangular cross section when the sealing member 16 is cut along an axial direction of the plunger 5. An orifice 16a is formed on an outer peripheral portion of the sealing member 16 for always communicating the damper chamber 17 with the space 3b. Additionally, a bias cut portion 16b is formed in the sealing member 16 at a position different from a position at which the orifice 16a is formed. The sealing member 16 is capable of being attached into the seal housing groove 5a by being expanded in the radial direction by the bias cut portion 16b.

The seal housing groove 5a is provided with a first surface 5b and a second surface 5c that face each other with a predetermined distance L in a moving direction X of the plunger 5, and a groove portion outer peripheral surface 5d which is positioned between the first surface 5b and the second surface 5c. The predetermined distance L is set to a value larger than the dimension of the sealing member 16 in the moving direction X of the plunger 5, that is a thickness t of the sealing member 16. Therefore, a gap is always created between an end face of the sealing member 16 in a direction of the thickness t and at least one of the first surface 5b and the second surface 5c. Moreover, a communication passage 18 is formed between the groove portion outer peripheral surface 5d and an inner peripheral surface of the sealing member 16.

At least one communication groove 5e which is parallel with the moving direction X of the plunger 5 is formed on the outer peripheral surface of the plunger 5. The communication groove 5e extends from the seal housing groove 5a to the damper chamber 17. Moreover, as particularly apparent from FIG. 4, a part of the communication groove 5e is positioned at an inner side than the inner peripheral surface of the sealing member 16 when viewed from the moving direction X of the plunger 5. Accordingly, the damper chamber 17 is always communicated with the communication passage 18.

Next, an operation of the solenoid valve 1 with the above described structure will be explained. FIG. 1 shows a state of the solenoid valve 1 when current is not applied to the coil 11. As shown in FIG. 1, when current is not applied, the plunger 5 is urged toward the a side of the valve seat 6 by elastic force of the spring 9, whereby the valve element 50 is seated on the seat 6b of the valve seat 6, and the solenoid valve 1 is closed.

On the other hand, when current is applied to the coil 11, a magnetic field is created by the coil 11 and a magnetic path is created by the guide 3, the plunger 5 and the stator core 7 and the like. Next, the plunger 5 is attracted to the side of the stator core 7 by magnetic attraction force, whereby the plunger 5 moves resisting the spring 9. Accordingly, the valve element 50 is separated from the seat 6b of the valve seat 6, and the fluid passage A is communicated with the communication hole 6a, the space 3b of the guide 3, and the communication hole 3c. Accordingly, the solenoid valve 1 is communicated when current is applied to the coil 11.

In opening and closing operations the solenoid valve 1 like this, when the plunger 5 is attracted to the side of the stator core 7 because current is applied to the coil 11, the communication passage 18 is closed and the damping effect is achieved. That is, when the plunger 5 moves toward the side of the stator core 7, the end face on a side of the space 3b of the sealing member 16 contacts the first surface 5b of the seal housing groove 5a, whereby the gap between the communication passage 18 and the space 3b is closed. Accordingly, the damper chamber 17 and the space 3b are communicated only through the orifice 16a, thereby the damping effect being achieved.

On the other hand, when current application to the coil 11 is stopped and the plunger 5 is moving toward the side of the valve seat 6, the communication passage 18 is opened, and thus the damping effect is not exerted. That is, as shown in FIGS. 3 and 4, when the plunger 5 moves toward the side of the valve seat 6, the end face of the sealing member 16 on the side of the space 3b separates from the first surface 5b of the seal housing groove 5a, whereby a portion between the communication passage 18 and the space 3b is opened. At this time, the end face of the sealing member 16 on the side of the damper chamber 17 contacts the second surface 5c of the seal housing groove 5a. However, since a part of the communication groove 5e is communicated with the communication passage 18, the damper chamber 17 is communicated with the communication passage 18 through the communication groove 5e. Therefore, the damper chamber 17 is communicated with the space 3b through the orifice 16a and the communication passage 18, whereby the damping effect is not exerted.

As described above, according to the first embodiment, in accordance with movement of the plunger 5, the sealing member 16 moves relatively with the plunger 5 so as to open and close the communication passage 18. Further, when the plunger 5 moves in a direction because the damping effect is not necessary affected, the communication passage 18 is opened with a valve opening pressure being zero. Therefore, delay in response which occurred with a conventional solenoid valve caused by the damping effect which is exerted until the check valve is opened does not occur.

Further, according to the first embodiment, the sealing member 16 and the plunger 5 cooperatively serves as a function of a check valve. Therefore, a number of component parts of the check valve can be reduced. Further, since the check valve according to the first embodiment dose not use a spring, dispersion in the responsiveness of the solenoid valve can be reduced.

Note that according to the first embodiment the damping effect was prevented from being exerted when the plunger 5 moves toward the side of the valve seat 6. However, it is possible to prevent the damping effect from being exerted when the plunger 5 moves toward the side of the stator core 7. This modification may be embodied by abolishing the communication groove 5e of the plunger 5, while providing a communication groove on the outer peripheral surface of the plunger 5 which always communicates the space 3b with the communication passage 18.

Second Embodiment

Figure 6:
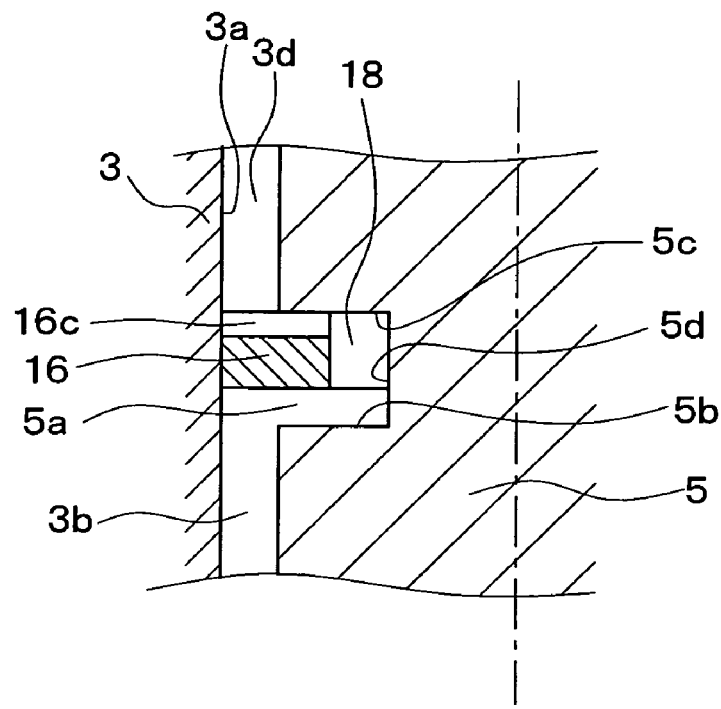
FIG. 6 is a sectional view of a structure of a main portion of the solenoid valve according to a second embodiment of the present invention.
Figure 7:
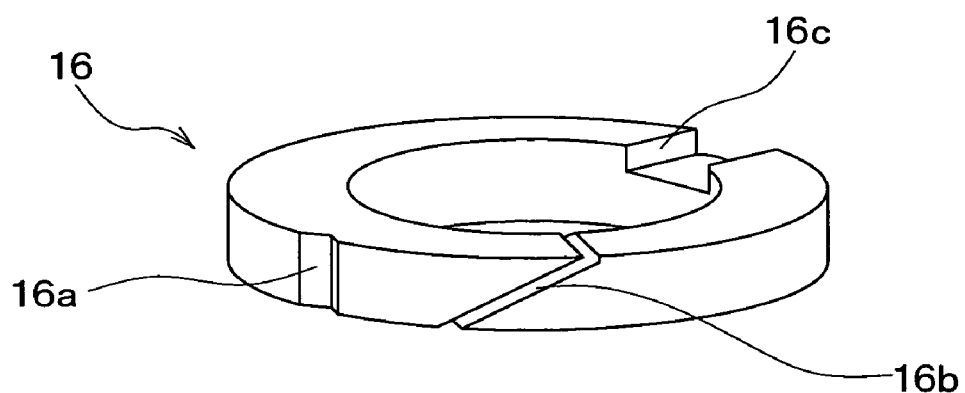
FIG. 7 is a perspective view of the sealing member of FIG. 6.

FIG. 6 is a sectional view of a structure of a main portion of the solenoid valve 1 according to a second embodiment of the present invention, and FIG. 7 is a perspective view of the sealing member 16 of FIG. 6. The second embodiment differs from the first embodiment only with the plunger 5 and the sealing member 16, and other structure thereof is the same as the first embodiment. Therefore, an explanation will be given only on the difference.

In the solenoid valve 1 according to the second embodiment, the communication groove 5e of the plunger 5 is abolished. The seal housing groove 5a of the plunger 5 is communicated with the damping chamber 17 through a gap 3d between the guide hole 3a of the guide 3 and the outer peripheral surface of the plunger 5.

On the other hand, a communication groove 16c is formed in the sealing member 16. The communication groove 16c is formed in the end face of the sealing member 16 on the side of the damper chamber 17, that is, a surface of the seal housing groove 5a, that faces the second surface 5c, thereby always communicating a gap 3d with the communication passage 18.

Further, as shown in FIG. 6, when current application to the coil 11 is stopped and the plunger 5 moves toward the side of the valve seat 6, the end face of the sealing member 16 on the side of the damper chamber 17 contacts the second surface 5c of the seal housing groove 5a. Even in this state, the gap 3d is communicated with the communication passage 18 through the communication groove 16c of the sealing member 16. Therefore, the damper chamber 17 is communicated with the space 3b through the orifice 16a and the communication passage 18, whereby the damping effect is not exerted.

In the second embodiment, the same effect as the first embodiment can be obtained. Moreover, in the second embodiment, since it is possible to abolish the communication groove 5e of the plunger 5, additional processing to the plunger 5 can be reduced.

Note that it is possible to prevent the damping effect from being exerted when the plunger 5 moves toward the side of the stator core 7, by attaching the sealing member 16 to the seal housing groove 5a of the plunger 5 such that the communication groove 16c faces the first surface 5b.

(Modifications)

In the first and second embodiments, the orifice 16a is formed in the sealing member 16. However, the orifice 16a for always communicating the damper chamber 17 and the space 3b may be formed in the plunger 5.

Further, in the first and second embodiments, a normally-closed solenoid valve is employed which is closed when current is not applied to the coil 11. However, the present invention is also applied to a normally-open solenoid valve which is opened when current is not applied to the coil 11.

While the above description is of the preferred embodiments of the present invention, it should be appreciated that the invention may be modified, altered, or varied without deviating from the scope and fair meaning of the following claims.

What is claimed is:

1. A solenoid valve comprising:
    a coil creating a magnetic field when current is applied;
    cylindrical members which are cylindrically-shaped and disposed in an inner periphery side of the coil;
    a plunger which is disposed so as to be slidable in the cylindrical members and attracted in in a direction corresponding to current application to the coil;
    a spring which presses the plunger to the other direction; and
    a valve element which moves together with the plunger and opens and closes a fluid passage in which fluid flows; the solenoid valve further comprising:
    a ring-shaped seal housing groove which is formed in an outer peripheral surface of the plunger and provided with a first surface and a second surface that face each other with a predetermined distance in a moving direction of the plunger, and
    a ring-shaped sealing member which is attached in the seal housing groove for forming a damper chamber isolated from the fluid passage on one end side of the plunger, wherein
    the predetermined distance is set to a value larger than a dimension of the sealing member in a moving direction of the plunger such that a gap is always created between the sealing member and at least one of the first surface and the second surface,
    a communication passage for communicating the fluid passage with the damper chamber is formed between an inner peripheral surface of the sealing member and the plunger and is always in communication with the damper chamber, and
    the communication passage is closed when the sealing member contacts the first surface, and the communication passage is opened when the sealing member is separated from the first surface.

2. The solenoid valve according to claim 1, wherein a communication groove is formed on an outer peripheral surface of the plunger for always communicating the damper chamber and the communication passage.

3. The solenoid valve according to claim 2, wherein at least a part of the communication groove is positioned at an inner side than the inner peripheral surface of the sealing member when viewed from the moving direction of the plunger.

4. The solenoid valve according to claim 1, wherein a communication groove is formed in a surface of the sealing member, that faces the second surface, for always communicating the damper chamber with the communication passage.

* * * * *